(12) United States Patent
Kosyachkov

(10) Patent No.: US 7,129,633 B2
(45) Date of Patent: Oct. 31, 2006

(54) SILICON OXYNITRIDE PASSIVATED RARE EARTH ACTIVATED THIOALUMINATE PHOSPHORS FOR ELECTROLUMINESCENT DISPLAYS

(75) Inventor: Alexander Kosyachkov, Mississauga (CA)

(73) Assignee: Ifire Technology Inc., Fort Saskatchewan (CA)

( * ) Notice: Subject to any disclaimer, the term of this patent is extended or adjusted under 35 U.S.C. 154(b) by 90 days.

(21) Appl. No.: 10/661,910

(22) Filed: Sep. 12, 2003

(65) Prior Publication Data

US 2005/0035704 A1   Feb. 17, 2005

Related U.S. Application Data

(60) Provisional application No. 60/409,991, filed on Sep. 12, 2002.

(51) Int. Cl.
*H05B 33/14* (2006.01)
*H05B 33/00* (2006.01)

(52) U.S. Cl. ............ 313/503; 313/506; 428/690; 428/917

(58) Field of Classification Search ........ 428/690, 428/917; 427/566; 313/503, 506, 504, 509; 252/301.4 R, 301.45; 257/77
See application file for complete search history.

(56) References Cited

U.S. PATENT DOCUMENTS

| 3,388,277 | A |   | 6/1968  | Thornton, Jr. |   |
|-----------|---|---|---------|---------------|---|
| 4,188,565 | A | * | 2/1980  | Mizukami et al. | 313/509 |
| 4,774,435 | A |   | 9/1988  | Levinson |   |
| 4,897,319 | A |   | 1/1990  | Sun |   |
| 4,954,747 | A |   | 9/1990  | Tuenge et al. |   |
| 5,598,059 | A |   | 1/1997  | Sun et al. |   |
| 5,714,274 | A | * | 2/1998  | Sugiura et al. | 428/690 |
| 6,016,012 | A | * | 1/2000  | Chatila et al. | 257/775 |
| 6,322,860 | B1 |  | 11/2001 | Stein et al. |   |
| 6,388,378 | B1 |  | 5/2002  | Törnqvist et al. |   |
| 6,392,334 | B1 |  | 5/2002  | Alwan |   |
| 6,597,108 | B1 | * | 7/2003  | Yano et al. | 313/503 |
| 6,686,062 | B1 | * | 2/2004  | Cheong et al. | 428/690 |
| 2001/0055458 | A1 | | 12/2001 | Ladd |   |
| 2002/0001733 | A1 | | 1/2002  | Yano |   |
| 2002/0005506 | A1 | | 1/2002  | Yano et al. |   |
| 2002/0006051 | A1 | | 1/2002  | Yano et al. |   |
| 2002/0031685 | A1 | | 3/2002  | Yano et al. |   |
| 2002/0037430 | A1 | | 3/2002  | Takeishi et al. |   |
| 2002/0056842 | A1 | | 5/2002  | Yamazaki |   |
| 2002/0060325 | A1 | | 5/2002  | Yano et al. |   |
| 2002/0064682 | A1 | | 5/2002  | Yano et al. |   |
| 2002/0084464 | A1 | | 7/2002  | Yamazaki et al. |   |
| 2002/0094451 | A1 | | 7/2002  | Li et al. |   |
| 2002/0122895 | A1 | * | 9/2002  | Cheong et al. | 427/566 |

* cited by examiner

*Primary Examiner*—Rena Dye
*Assistant Examiner*—Camie S. Thompson
(74) *Attorney, Agent, or Firm*—Fay, Sharpe, Fagan, Minnich & McKee, LLP

(57) ABSTRACT

A novel structure is provided to improve the operating stability of thioaluminate based phosphors used in ac thick film dielectric electroluminescent displays. The novel structure comprises a rare earth activated alkaline earth thioaluminate phosphor thin film layer and a silicon oxynitride layer provided directly adjacent the top and/or bottom of the phosphor thin film layer, wherein said silicon oxynitride layer comprises a composition of $Si_3N_xO_yH_z$ where $2 \leq x \leq 4$, $0 < y \leq 2$ and $0 \leq z \leq 1$. The invention is particularly applicable to phosphors used in electroluminescent displays that employ thick dielectric layers subject to high processing temperatures to form and activate the phosphor films.

46 Claims, 2 Drawing Sheets

SILICON OXYNITRIDE PASSIVATED RARE EARTH ACTIVATED THIOALUMINATE PHOSPHORS FOR ELECTROLUMINESCENT DISPLAYS

This application claims the benefit of U.S. Provisional patent application Ser. No. 60/409,991, filed Sep. 12, 2002.

FIELD OF THE INVENTION

The present invention relates to improving the operating stability of blue light-emitting phosphor materials used for full color ac electroluminescent displays employing thick film dielectric layers with a high dielectric constant. More specifically, the invention relates to improved rare earth activated thin film barium thioaluminate phosphors laminated with one or more silicon oxynitride layers.

BACKGROUND TO THE INVENTION

Thick film dielectric electroluminescent devices as exemplified by Applicant's U.S. Pat. No. 5,432,015 exhibit superior characteristics to that of traditional TFEL displays. High performance red, green and blue phosphor materials have been developed for use with thick film dielectric structures to provide increased luminance performance. These phosphor materials include europium activated barium thioaluminate based materials for blue emission, terbium activated zinc sulfide, manganese activated magnesium zinc sulfide or europium activated calcium thioaluminate based materials for green emission, as well as traditional manganese activated zinc sulfide that can be appropriately filtered for red emission.

The thin film phosphor materials used for red, green and blue sub-pixels must be patterned using photolithographic techniques employing solvent solutions for high resolution displays. Traces of these solutions remaining in the display following photolithographic processing together with reaction of moisture or oxygen present in the processing environment may react chemically with certain phosphor materials that are sensitive to oxidation or hydrolysis reactions to cause performance degradation of the completed display. Continued chemical reactions during operation of the display may cause continued performance degradation thereby shortening the life of the display.

To overcome such performance degradation problems, researchers have proposed the use of various silicon materials including silicon nitride ($Si_3N_4$), silicon oxide ($SiO_2$) and silicon oxynitride (SiON) as insulators in conjunction with phosphor materials to help decrease degradation of the phosphor. Insulator or barrier layers of these materials are traditionally taught for use with zinc sulfide phosphors in TFEL, OLED and EL devices as exemplified in U.S. Pat. Nos. 4,188,565, 4,721,631, 4,774,435, 4,880,661, 4,897,319, 4,954,747, 5,598,059, 5,644,190, 6,322,860, 6,388,378 and 6,392,334 as well as by U.S. Patent Application Nos. 2001/0055458, 2002/0001733, 2002/0005506, 2002/0006051, 2002/0037430 and 2002/0084464 and in Mikami et al., (Proceedings of the $6^{th}$ International Conference on the Science and Technology of Display Phosphors (2000) pp 61–64) and J. Ohwaki et al., (Review of the Electrical Communications laboratories Vol. 35, 1987).

Silicon materials have also been suggested for use as a film insulating layer on top of a barium magnesium oxythioaluminate phosphor used within EL panels as for example disclosed in U.S. Patent Application No. 2002/0031685.

The Applicant's U.S. Patent Application No. 2002/0094451 teaches that silicon oxynitride is not desirable for use as an insertion layer with an europium activated barium thioaluminate phosphor but rather that barium titanate is suitable as it provides for superior luminance and increased barrier properties for the diffusion of contaminant species such as lead from the thick dielectric layer into the phosphor. Therefore one skilled in the art would be discouraged to use silicon oxynitride (SiON) with thioaluminate phosphors based on the teachings of the prior art.

While the aforementioned references and patents may teach the use of a conventional silicon nitride and silicon oxynitride as "barrier" or "insulator" material for the purpose of preventing reaction of a zinc sulfide phosphor with water from the ambient environment or some other "stabilizing" type function, there remains a need to provide an improved rare earth activated alkaline earth thioaluminate phosphors used in thick dielectric film electroluminescent displays in order to provide both improved luminance and a long operating life with minimal degradation.

SUMMARY OF THE INVENTION

The present invention relates to a thick film dielectric electroluminescent device employing a thin film alkaline earth thioaluminate phosphor doped with a rare earth activator species that has a long operating life with minimal luminance degradation. The improved operating life is achieved by providing adjacent the phosphor film, one or more silicon oxynitride passivating layers having a limited quantity of oxygen.

The silicon oxynitride passivating layers of the invention may be represented as $Si_3N_xO_yH_z$ where $2 \leq x \leq 4$, $0 \leq y \leq 2$ and $0 \leq z \leq 1$. The silicon oxynitride layers of the invention may also comprise a composite material containing two or more of such silicon oxynitride compositions having different values of x, y and z. The anions (N, O and H) within the composition of the layer must be sufficiently strongly bonded within the layer so as not to migrate into the phosphor layer during device fabrication or operation.

The alkaline earth thioaluminate phosphor may comprise a material of the form $AB_xC_y$:RE where A is at least one of Mg, Ca, Sr or Ba, B is at least one of Al, Ga or In and C is least one of S or Se and where $2 \leq x \leq 4$ and $4 \leq y \leq 7$. The thioaluminate phosphor may also include oxygen at a relative atomic concentration that is less than 25 atomic percent. The RE is selected from one or more rare earth activator species that generate the required light spectrum and is preferably Eu or Ce.

According to an aspect of the present invention there is provided an improved phosphor structure for a thick dielectric film electroluminescent device, said structure comprising;

a rare earth activated alkaline earth thioaluminate phosphor thin film layer;

a silicon oxynitride layer provided directly adjacent the top and/or bottom of said phosphor thin film layer, wherein said silicon oxynitride layer comprises a composition of $Si_3N_xO_yN_z$ where $2 \leq x \leq 4$, $0 < y \leq 2$ and $0 \leq z \leq 1$.

According to another aspect of the invention is a thick film dielectric electroluminescent device comprising;

a thin thioaluminate phosphor layer of formula $AB_xC_y$:RE where A is at least one of Mg, Ca, Sr or Ba, B is at least one of Al, Ga or In and C is least one of S or Se, $2 \leq x \leq 4$ and $4 \leq y \leq 7$ and Re is selected from terbium and europium; and a passivating silicon oxynitride layer provided directly adjacent the top and/or bottom of said phosphor thin film layer, wherein said silicon oxynitride layer comprises a composition of $Si_3N_xO_yH_z$ where $2 \leq x \leq 4$, $0 < y \leq 2$ and $0 \leq z \leq 1$.

According to yet another aspect of the present invention is a phosphor laminate for use in a thick film dielectric electroluminescent display, said laminate comprising;

a rare earth activated alkaline earth thioaluminate phosphor thin film layer;

a silicon oxynitride layer provided directly adjacent the top of said phosphor thin film layer, wherein said silicon oxynitride layer comprises a composition of $Si_3N_xO_yH_z$ where $2 \leq x \leq 4$, $0 < y \leq 2$ and $0 \leq z \leq 1$.

According to still another aspect of the present invention is a phosphor laminate for use in a thick film dielectric electroluminescent display, said laminate comprising;

a rare earth activated alkaline earth thioaluminate phosphor thin film layer;

a silicon oxynitride layer provided directly adjacent the top and the bottom of said phosphor thin film layer, wherein said silicon oxynitride layer comprises a composition of $Si_3N_xO_yH_z$ where $2 \leq x \leq 4$, $0 < y \leq 2$ and $0 \leq z \leq 1$.

According to yet another aspect of the present invention is a phosphor laminate for use in a thick film dielectric electroluminescent display, said laminate comprising;

a rare earth activated alkaline earth thioaluminate phosphor thin film layer;

a silicon oxynitride layer provided directly adjacent the bottom of said phosphor thin film layer, wherein said silicon oxynitride layer comprises a composition of $Si_3N_xO_yH_z$ where $2 \leq x \leq 4$, $0 < y \leq 2$ and $0 \leq z \leq 1$.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the description given herein, and from the accompanying drawings, which are given by way of illustration only and do not limit the intended scope of the invention.

DETAILED DESCRIPTION OF THE INVENTION

The present invention relates to the use of rare earth activated alkaline earth thioaluminate thin film phosphors in a thick film dielectric electroluminescent device where the phosphor film is in contact with at one or both surfaces with a passivating silicon oxynitride layer having a limited quantity of oxygen such that this layer improves the electrical and chemical stability of the phosphor film and its interface with the rest of the electroluminescent device.

Figure 1:
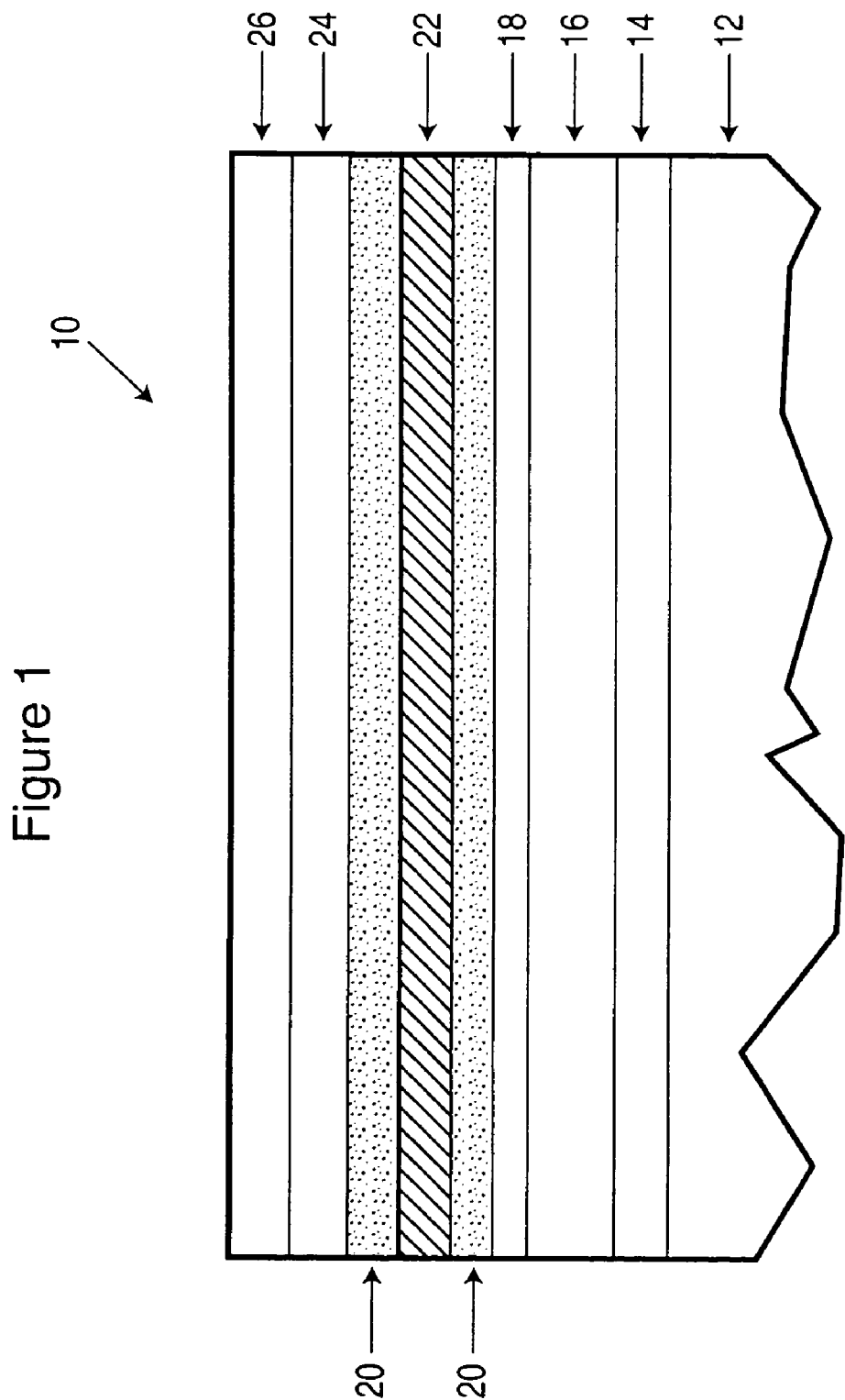
FIG. 1 shows a schematic drawing of the cross section of a thick film dielectric electroluminescent device showing the position of silicon oxynitride layers of the present invention.

FIG. 1 shows a schematic drawing of the cross section of a thick film dielectric electroluminescent device of the present invention generally indicated by reference numeral 10. The device 10 has a substrate 12 with a metal conductor layer 14 (ie. gold), a thick film dielectric layer 16 (i.e. PMT-PT) and a smoothing layer 18 (i.e. lead zirconate titanate) thereon. A variety of substrates may be used, as will be understood by persons skilled in the art. In particular, the substrate is a thick film dielectric layer on a ceramic substrate. Examples of such substrates include alumina and glass ceramic composites. A passivating silicon oxynitride layer 20 is shown to be present adjacent the phosphor layer 22. While this passivating layer 20 is shown on both sides of the phosphor 22, it is understood that only one such layer either above or below the phosphor may be used. A thin film dielectric layer 24 and then an ITO transport electrode 26 are present above the phosphor.

The passivating silicon oxynitride layer acts to minimize migration of oxygen into the phosphor material during device operation that may react with the phosphor material to cause performance degradation. The silicon oxynitride layer may provide this function by acting as a barrier to oxygen migration or by reacting with the oxygen to tie it up so that it is no longer available to react with the phosphor to an extent to cause a reduction in device luminance.

The invention is particularly applicable to electroluminescent devices employing a thick film dielectric layer having a high dielectric constant wherein the thick film dielectric layer is a composite material comprising two or more oxide compounds that may evolve chemical species that are deleterious to phosphor performance in response to thermal processing or device operation and wherein the surface of the thick dielectric is rough on the scale of the phosphor thickness resulting in cracks or pinholes through the device structure and contains voids that may contain or absorb such species, thus contributing to a loss of luminance and operating efficiency over the operating life of the device.

The silicon oxynitride layers of the invention are represented as $Si_3N_xO_yH_z$ where $2 \leq x \leq 4$, $0 < y \leq 2$ and $0 \leq z \leq 1$. As such, silicon nitrides are also encompassed by the present invention. The silicon oxynitride layers of the invention may also comprise a composite material containing two or more of silicon oxynitride compositions having different values of x, y and z. The anions (N, O and H) within the composition of the layer must be sufficiently strongly bonded within the layer so as not to migrate into the phosphor layer during device fabrication or operation. The silicon oxynitride layers may have a thickness of about 30 nm to about 70 nm and any range or ranges in between The thioaluminate phosphor used in conjunction with the silicon oxynitride layers comprises a material of the form $AB_xC_y$:RE where A is at least one of Mg, Ca, Sr or Ba, B is at least one of Al, Ga or In and C is least one of S or Se and where $2 \leq x \leq 4$ and $4 \leq y \leq 7$. The thioaluminate phosphor may also include oxygen at a relative atomic concentration that is less than about 20 atomic percent. RE is one or more rare earth activator species that generate the required light spectrum and is preferably Eu or Ce.

To ensure that the silicon oxynitride layers adhere well to the phosphor film the composition of the silicon oxynitride should be controlled. The silicon oxynitride layers may be deposited by any suitable method as is understood by one of skill in the art. However, it has been demonstrated that the reactive sputtering of a silicon nitride target in a low pressure nitrogen atmosphere followed by annealing of the film in air provides a proper composition of the films. The ratio of argon to nitrogen is within the range of about 4:1 to 1:1 and the working pressure is maintained within the range of about $8 \times 10^{-4}$ mbar to $6 \times 10^{-3}$ mbar. If the ratio of argon to nitrogen is too low, the deposited film will have a sufficient internal stress and can delaminate after deposition. If the ratio is too high the deposited film may be chemically reactive and have an unacceptably high electrical conductivity.

The present invention may comprise a variety of embodiments. For example, in a first embodiment of the invention a thick film dielectric electroluminescent device has a thick dielectric layer and a barium thioaluminate phosphor film wherein the ratio of aluminum to barium is between 2 and 4. A silicon oxynitride layer is positioned adjacent the phosphor film and a thin film upper dielectric layer upon which is disposed an indium tin oxide transparent conductor film.

In a second embodiment of the invention is a thick film dielectric electroluminescent device has a thick dielectric layer and a barium thioaluminate phosphor film wherein the ratio of aluminum to barium is between 2 and 4. A silicon oxynitride layer is positioned adjacent the phosphor film and an indium tin oxide transparent conductor film in place of an upper alumina or other thin film dielectric layer.

In a third embodiment of the invention a thick film dielectric electroluminescent device has a thick dielectric layer and a barium thioaluminate phosphor film wherein the ratio of aluminum to barium is between 2 and 4. A silicon oxynitride layer is positioned adjacent the phosphor film and the thick dielectric layer so that it is in direct contact with the phosphor film In a fourth embodiment of the invention is a thick film dielectric electroluminescent device has a thick dielectric layer and a barium thioaluminate phosphor film wherein the ratio of aluminum to barium is between 2 and 4. Two silicon oxynitride layers are provided, one positioned between the phosphor film and an indium tin oxide transparent conductor film and the other positioned between the phosphor film and the thick dielectric layer so that it is in direct contact with the phosphor film.

In a fifth embodiment of the present invention a thick film dielectric electroluminescent device is as described in any of the first to fourth embodiments where the phosphor composition that includes magnesium with the ratio of the atomic concentration of magnesium to barium plus magnesium is in the range 0.001 to 0.2.

In a sixth embodiment of the invention a thick film dielectric electroluminescent device of any of the first to fifth embodiments where the phosphor is activated with trivalent europium or cerium, preferably europium. and wherein the atomic ratio of europium or cerium to barium or barium plus magnesium is in the range of about 0.005 to about 0.04 and preferably in the range of about 0.015 to 0.03.

While the mechanism by which the silicon oxynitride layers effect the improvement is not fully understood, it is believed that they act as a barrier to chemical species that may cause a reduction in the realizable luminance of the phosphor material by causing a reduction in the efficiency with which electrons are injected into the phosphor film during operation of the device, by causing a reduction in the efficiency with which electrons interact with the activator species in the phosphor material to emit light, or by reducing the efficiency by which light generated in the phosphor is transmitted from the device to provide useful luminance.

The degradation may involve reaction of oxygen or water with the phosphor material to change the chemical composition of at least a portion of the phosphor material. Preventing oxygen from reacting with the phosphors may help ensure that the rare earth activator species remain dissolved in the crystal lattice of the host thioaluminate compounds. Reaction of the phosphor with oxygen may cause precipitation of aluminum oxide from the phosphor, causing the remaining material to become more barium rich. It is known many different thioaluminate compounds exist with different ratios of alkaline earth elements to aluminum and that not all of them are efficient phosphor hosts. Further, the rare earth species may come out of solution in the host thioaluminate to precipitate as oxysulfide species such as $RE_2O_2S$ where RE represents a rare earth element. The formation of these compounds in a sulfur-bearing environment at very low oxygen partial pressure is well known, as for example described by R. Akila et al in Metallurgical Transactions, Volume 18B (1987) pp. 163–8. The silicon oxynitride layers of the invention may reduce the rate of these reactions by acting as a barrier or a scavenger for oxygen originating from outside of the phosphor layer, for example from within the thick dielectric structure of the device, residual species from chemicals used in the photolithographic processes used to pattern the phosphor and adjacent thin film layers, or the external environment.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

A thick dielectric electroluminescent device incorporating thin film phosphor layers comprising barium thioaluminate activated with europium was constructed. The thick film substrate was comprised of a 5 cm by 5 cm alumina substrate having a thickness of 0.1 cm. A gold electrode was deposited on the substrate, followed with a thick film high dielectric constant dielectric layer in accordance with the methods exemplified in Applicant's co-pending international application PCT CA00/00561 filed May 12, 2000 (the entirety of which is incorporated herein by reference). A thin film dielectric layer consisting of barium titanate, with a thickness of about 100–200 nanometers, was deposited on top of the thick film dielectric layer using the sol gel technique described in Applicant's co-pending U.S. patent application Ser. No. 09/761,971 filed Jan. 17, 2001 (the entirety of which is incorporated herein by reference).

A barium thioaluminate phosphor film activated with about 5 atomic percent of europium with respect to barium was reactively sputtered using an Edwards model AUTO 306 sputtering system in a hydrogen sulfide atmosphere on top of the barium titanate layer using an aluminum metal target and a europium doped barium sulfide target according to the methods of U.S. patent application Ser. No. 09/867, 080 filed May 29, 2001 (the entirety of which is incoparated herein by reference). The targets were in the form of 3 inch diameter discs. The deposition was carried out so that the atomic ratio of aluminum to barium in the deposited film was from about 2.6 to about 2.9 as shown in Table 1 below. The substrate during deposition was at a temperature of 250° C. The chamber was initially evacuated to a pressure of $2\times10^{-5}$ mbar and then hydrogen sulfide was injected at a rate of 2.5 to 4.5 sccm and argon was injected at a rate of 7 sccm to maintain a gas pressure in the range 1.1 to $1.4\times10^{-3}$ mbar during the deposition. The rf power applied to the aluminum target was 200 watts and the power to the barium sulfide target was about 130 watts. The growth rate of the film was 4 to 6 Angstroms per second and the film thickness was in the range of about 360 nm to 420 nm. The atomic ratio of aluminum to barium in the phosphor film, as measured by energy dispersive x-ray analysis on a film deposited under the same conditions on a silicon wafer was found to be about 2.6:1

Following deposition the deposited phosphor was annealed under nitrogen in a belt furnace with a peak temperature of about 700° C. for about 12 minutes.

Fifty nanometer thick silicon oxynitride layers were sputter-deposited using a 3 inch cylindrical $Si_3N_4$ target. The sputtering atmosphere was maintained by injecting nitrogen at a rate of 3 sccm and argon at 7 sccm into the sputtering chamber to maintain a pressure of $1.1\times10^{-3}$ mbar. The substrate was at a temperature of 250° C. during the deposition. The rf power to the sputtering target was 250 watts. The deposition rate was 5 Angstroms per second. Energy-dispersive x-ray spectroscopic analysis of the film shows that it contains 2 to 20 atomic percent of oxygen coming to the film from the phosphor-silicon nitride interface and residual atmosphere of the deposition chamber. X-ray diffraction analysis showed that the film had an amorphous structure.

Next a 50 nanometer thick alumina layer was deposited and an indium tin oxide upper conductor film was deposited according to the methods of Applicant's co-pending international application PCT CA00/00561 (the entirety of which is incorporated herein by reference) and the completed device was annealed in air at about 550° C. and then annealed under nitrogen at about 550° C. following deposition of the indium tin oxide and prior to testing.

The electroluminescence of the completed device was measured by applying a 240 Hz alternating polarity square wave voltage waveform with a pulse width of 30 nanoseconds and an of amplitude 60 volts about the optical threshold voltage for the device. The data on the initial luminance and time of reduction of the luminance to half of the initial value (half-life) are shown in Table 1. The ratio of the operational half-life over that for a similar device constructed without the silicon oxynitride layer, as shown in Table 1 was about 12.

Example 2

An electroluminescent device similar to that of example 1, except that the alumina dielectric layer between the silicon oxynitride layer and the indium tin oxide layer was omitted. The performance and life data for this device are shown in the second line of Table 1 and are compared against the performance and life data for a device constructed with an alumina layer in place of the silicon oxynitride layer.

Example 3

An electroluminescent device similar to that of example 1, except that the silicon oxynitride layer was positioned between the barium titanate dielectric layer and the phosphor layer and between the phosphor layer and the upper alumina layer and that the atomic ratio of aluminum to barium in the phosphor layer was 2.9:1 rather than 2.6:1. The performance and life data for this device are shown in the third line of Table 1 and are compared against the performance and life data for a similar device without the silicon oxynitride layer.

Example 4

Figure 2:
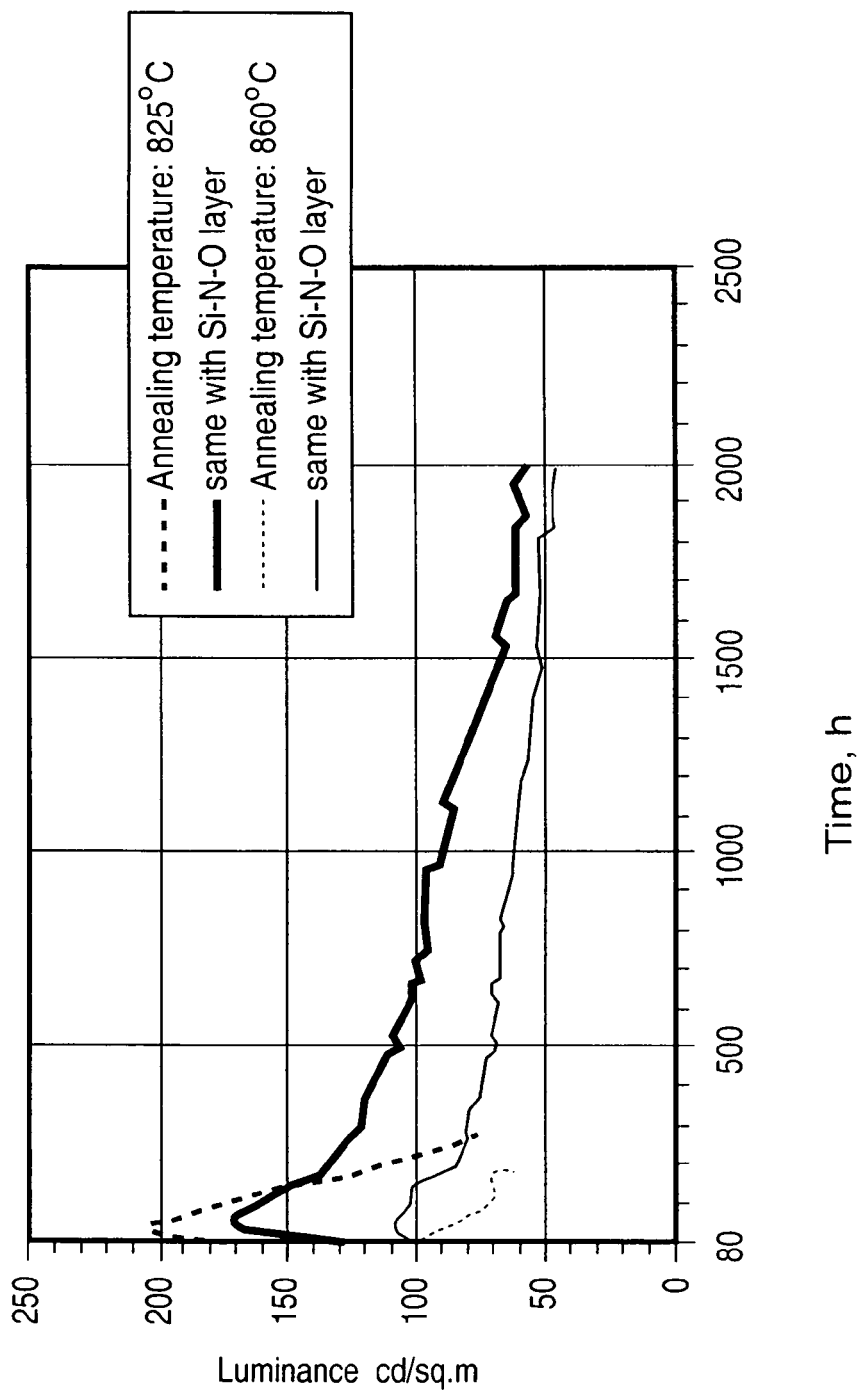
FIG. 2 is a graph comparing the luminance versus cumulative operating time for the thick film dielectric electroluminescent devices having a europium activated barium thioaluminate phosphor annealed in situ in the sputtering chamber in low pressure oxygen and having an adjacent silicon oxynitride layer against a similar devices without the silicon oxynitride layer.

Two electroluminescent devices were constructed similar to that of Example 1, except that instead of the phosphor layers being annealed under nitrogen in a belt furnace following deposition, they were annealed in situ in the sputtering chamber without breaking vacuum. The annealing was done by rotating the devices so that they were adjacent to a radiant heater. The temperature of the devices was monitored using a thermocouple attached to them. The annealing was done for 10 minutes under an oxygen pressure of $8\times10^{-3}$ mbar at a temperature of about 825° C. for one of the devices and at a temperature of about 860° C. for the other device. Two additional devices were constructed in a similar manner, but without silicon oxynitride layers. The test method was the same as for Example 1 except that the frequency of the applied voltage during life test was 1200 Hz rather than 240 Hz to accelerate the test. The luminance of these devices versus operating time is shown in FIG. 2. As can be seen from the figure, the devices annealed at 825° C. and 860° C. that did not have silicon oxynitride layers had half-lives of about 205 hours and 260 hours respectively, whereas the corresponding devices with silicon oxynitride layers had much longer half lives in excess of 2000 hours. This example also illustrates the benefit of annealing the phosphors in situ under low oxygen pressure in the vacuum deposition chamber and of selecting an optimum annealing temperature to extend the device life.

Although preferred embodiments of the invention have been described herein in detail, it will be understood by

TABLE 1

| Phosphor | | Without silicon oxynitride layer | | With silicon oxynitride layer | | Half-life |
| --- | --- | --- | --- | --- | --- | --- |
| Al/Ba Ratio | Example Number | Luminance, (cd/m$^2$) | Half-life (hours) | Luminance (cd/m$^2$) | Half-life (hours) | Improvement Ratio |
| 2.6 | 1 | 105 | 17 | 118 | 205 | 12 |
| 2.6 | 2 | 105 | 17 | 82 | 190 | 11 |
| 2.9 | 3 | 133 | 6 | 70 | 390 | 65 |

I claim:

1. An improved phosphor structure for a thick dielectric film electroluminescent device, said structure comprising;
    a rare earth activated alkaline earth thioaluminate phosphor thin film layer;
    a silicon oxynitride layer provided directly adjacent the top and/or bottom of said phosphor thin film layer, wherein said silicon oxynitride layer comprises a composition of $Si_3N_xO_yH_z$ where $2 \leq x \leq 4$, $0 < y \leq 2$ and $0 \leq z \leq 1$.

2. The structure of claim 1, wherein said phosphor thin film layer is represented by $AB_xC_y$:RE wherein
    A is at least one of Mg, Ca, Sr or Ba;
    B is at least one of Al, Ga or In;
    C is least one of S or Se; and
    $2 \leq x \leq 4$ and $4 \leq y \leq 7$.

3. The structure of claim 2, wherein RE is one or more rare earth activator species selected from the group consisting of Eu or Ce.

4. The structure of claim 3, wherein said phosphor is barium thioaluminate with a ratio of aluminum to barium between 2–4.

5. The structure of claim 3, wherein said phosphor is magnesium barim thioaluminate with a ratio of the atomic concentration of magnesium to barium plus magnesium is in the range 0.001 to 0.2.

6. The structure of claim 3, wherein the phosphor is activated with trivalent europium or cerium and the atomic ratio of europium or cerium to barium or barium plus magnesium is in the range of about 0.005 to about 0.04.

7. The structure of claim 3, wherein the phosphor is activated with trivalent europium or cerium and the atomic ratio of europium or cerium to barium or barium plus magnesium is in the range of about 0.015 to 0.03.

8. The structure of claim 3, wherein said phosphor may additionally comprise up to about 25 atomic percent oxygen.

9. The structure of claim 1, wherein said silicon oxynitride layer has a thickness of about 30 nm to about 70 nm.

10. The structure of claim 9, wherein said structure comprises a silicon oxynitride layer on the top of said phosphor thin film layer and a silicon oxynitride layer on the bottom of said phosphor thin film layer.

11. The structure of claim 9, wherein said structure comprises a silicon oxynitride layer on the top of said phosphor thin film layer.

12. The structure of claim 9, wherein said structure comprises a silicon oxynitride layer on the bottom of said phosphor thin film layer.

13. The structure of claim 9, wherein said silicon oxynitride layer comprises a composite material containing two or more silicon oxynitride compositions having different values of x, y and z.

14. The structure of claim 1, wherein said silicon oxynitride layer is deposited by sputtering.

15. The structure of claim 14, wherein sputtering is conducted in a low pressure nitrogen atmosphere where the ratio of argon to nitrogen is within the range of about 4:1 to 1:1 and the working pressure is maintained within the range of about $8 \times 10^{-4}$ mbar to $6 \times 10^{-3}$ mbar.

16. The structure of claim 1, wherein said silicon oxynitride layer is adhered to the phosphor thin film structure.

17. A thick film dielectric electroluminescent device comprising;
    a thin thioaluminate phosphor layer of formula $AB_xC_y$:RE where A is at least one of Mg, Ca, Sr or Ba, B is at least one of Al, Ga or In and C is least one of S or Se, $2 \leq x \leq 4$ and $4 \leq y \leq 7$ and Re is selected from terbium and europium; and
    a passivating silicon oxynitride layer provided directly adjacent the top and/or bottom of said phosphor thin film layer, wherein said silicon oxynitride layer comprises a composition of $Si_3N_xO_yH_z$ where $2 \leq x \leq 4$, $0 < y \leq 2$ and $0 \leq z \leq 1$.

18. The device of claim 17, wherein said phosphor is barium thioaluminate with a ratio of aluminum to barium between 2 to 4.

19. The device of claim 17, wherein said phosphor is magnesium barium thioaluminate with a ratio of the atomic concentration of magnesium to barium plus magnesium is in the range of about 0.001 to 0.2.

20. The device of claim 17, wherein the atomic ratio of europium or cerium to barium or barium plus magnesium is in the range of about 0.005 to about 0.04.

21. The device of claim 17, wherein the atomic ratio of europium or cerium to barium or barium plus magnesium is in the range of about 0.015 to 0.03.

22. The device of claim 17, wherein said phosphor may additionally comprise up to about 25 atomic percent of oxygen.

23. The device of claim 17, wherein said silicon oxynitride layer has a thickness of about 30 nm to about 70 nm.

24. The device of claim 23, wherein said structure comprises a silicon oxynitride layer on the top of said phosphor layer and a silicon oxynitride layer on the bottom of said phosphor layer.

25. The device of claim 23, wherein said structure comprises a silicon oxynitride layer on the top of said phosphor layer.

26. The device of claim 23, wherein said structure comprises a silicon oxynitride layer on the bottom of said phosphor layer.

27. The device of claim 23, wherein said silicon oxynitride layer comprises a composite material containing two or more silicon oxynitride compositions having different values of x, y and z.

28. The device of claim 17, wherein said silicon oxynitride layer is deposited by sputtering.

29. The device of claim 28, wherein sputtering is conducted in a low pressure nitrogen atmosphere where the ratio of argon to nitrogen is within the range of about 4:1 to 1:1 and the working pressure is maintained within the range of about $8 \times 10^{-4}$ mbar to $6 \times 10^{-3}$ mbar.

30. The device of claim 17, wherein said silicon oxynitride layer is adhered to the phosphor film.

31. A phosphor laminate for use in a thick film dielectric electroluminescent display, said laminate comprising;
    a rare earth activated alkaline earth thioaluminate phosphor thin film layer;
    a silicon oxynitride layer provided directly adjacent the top of said phosphor thin film layer, wherein said silicon oxynitride layer comprises a composition of $Si_xN_yO_yH_z$ where $2 \leq x \leq 4$, $0 \leq y \leq 2$ and $0 \leq z \leq 1$.

32. The laminate of claim 31, wherein said phosphor thin film layer is represented by $AB_xC_y$:RE wherein
    A is at least one of Mg, Ca, Sr or Ba;
    B is at least one of Al, Ga or In;
    C is least one of S or Se; and
    $2 \leq x \leq 4$ and $4 \leq y \leq 7$.

33. The laminate of claim 32, wherein RE is one or more rare earth activator species selected from the group consisting of Eu or Ce.

34. The laminate of claim 33, wherein said phosphor is barium thioaluminate with a ratio of aluminum to barium between 2–4.

35. The laminate of claim 34, wherein said phosphor is magnesium barim thioaluminate with a ratio of the atomic concentration of magnesium to barium plus magnesium is in the range 0.001 to 0.2.

36. The laminate of claim 34, wherein the phosphor is activated with trivalent europium or cerium and the atomic ratio of europium or cerium to barium or barium plus magnesium is in the range of about 0.005 to about 0.04.

37. The laminate of claim 34, wherein the phosphor is activated with trivalent europium or cerium and the atomic ratio of europium or cerium to barium or barium plus magnesium is in the range of about 0.015 to 0.03.

38. The laminate of claim 33, wherein said phosphor may additionally comprise up to about 25 atomic percent oxygen.

39. The laminate of claim 32, wherein said silicon oxynitride layer has a thickness of about 30 nm to about 70 nm.

40. The laminate of claim 39, wherein said laminate comprises a silicon oxynitride layer on the top of said phosphor thin film layer and a silicon oxynitride layer on the bottom of said phosphor thin film layer.

41. The laminate of claim 39, wherein said laminate comprises a silicon oxynitride layer on the top of said phosphor thin film layer.

42. The laminate of claim 41, wherein said laminate comprises a silicon oxynitride layer on the bottom of said phosphor thin film layer.

43. The laminate of claim 39, wherein said silicon oxynitride layer comprises a composite material containing two or more silicon oxynitride compositions having different values of x, y and z.

44. The laminate of claim 32, wherein said silicon oxynitride layer is deposited by sputtering.

45. The laminate of claim 44, wherein sputtering is conducted in a low pressure nitrogen atmosphere where the ratio of argon to nitrogen is within the range of about 4:1 to 1:1 and the working pressure is maintained within the range of about $8 \times 10^{-4}$ mbar to $6 \times 10^{-3}$ mbar.

46. The laminate of claim 31, wherein said silicon oxynitride layer is adhered to the phosphor thin film structure.

* * * * *